C. KNAPP.
COW MILKER.
No. 6,904.             Patented Nov. 27, 1849.
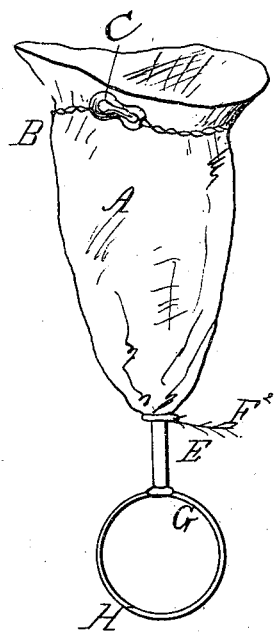
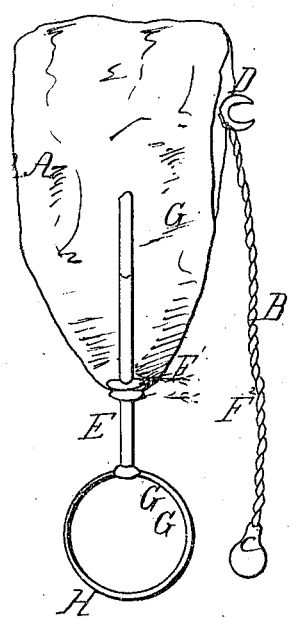
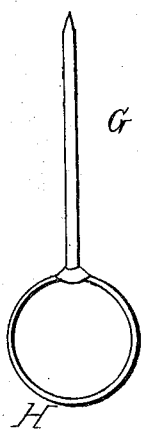

UNITED STATES PATENT OFFICE.

CYRUS KNAPP, OF NEW YORK, N. Y.

INSTRUMENT FOR MILKING COWS.

Specification of Letters Patent No. 6,904, dated November 27, 1849.

*To all whom it may concern:*

Be it known that I, CYRUS KNAPP, of the city, county, and State of New York, have invented a new and Improved Milk-Exhauster or Instrument for Milking Cows; and I do hereby declare the following to be a full and exact description.

The nature of my invention consists in the making of a sack, or pocket, of gutta percha, or other suitable material, for the purpose of encasing the teat of the cow. In the lower end of it, is secured a small silver tube, through the orifice of which, is inserted a gutta percha piston or exhauster. This tube and piston, (when the sack is applied to the teat,) is passed into the milk duct, when the piston is withdrawn, leaving the orifice of the tube open for the discharge of the milk in consequence of the artificial warmth like that of the mouth of the calf,) created by the impervious sack, and pressure of the band encircling the neck of it, and the teat. But to describe my invention more fully I will refer to the accompanying drawings, representing a perspective, and cut section of one of the instruments and a run of piston as detached from it, the same letters on the several drawings representing the same parts wherever they occur, letter A, the sack, made of gutta percha, or suitable water and air proof material, and size, for increasing the teat of a cow, attached to the neck or mouth of this sack is an elastic strap or cord, B, having a button C on its lower end, for buttoning into the eye D, when compressing the teat, to cause the cow to give down her milk, and in retaining the sack upon it. In the lower end of the sack, is a tube E, made of silver, (or other substance not liable to oxidize) secured by means of two small collars F', and F²; in the groove of which the edges of the sack are forced and tied, so as to prevent the circulation of air in contact with the teat, when it has been applied. Through the orifice of the tube, is inserted a piston or exhauster G. This piston is about 2 inches long, and made of gutta percha, though may be made of any suitable material, and is intended to act as a guide for the insertion of the tube into the milk canal, and is therefore made tapering at its point, and somewhat longer than the tube; and also as an exhauster, so that, when being withdrawn from the tube, it will cause the milk to follow it. On the end of the piston is a ring H, for the convenience of holding it, by placing it upon the finger after having withdrawn it from the tube; the ring however is not material, as a loop of any material would answer the purpose as well.

The operation of the milk exhauster is that, when it is to be used the maid, or person using it, turns the mouth of the sack down, or nearly inside out, so as to expose the entire inside of the tube. The tube is then gently inserted in the orifice of the teat, as far as it will go, when the sack is drawn up over it, and secured in that position by the band or cord, (which is elastic) encircling it and the teat. When thus properly secured, the piston is gently withdrawn, leaving the orifice of the teat distended by the sides of the tube, for the flowing of the milk, in consequence of the pressure and warmth imparted to it, (somewhat like that caused by the mouth of the calf) by the air tight sack, by which it is incased.

Having now described the mode of making, and operation of my invention, I will proceed to state what I claim and desire to secure by Letters Patent. What I claim therefore, is—

The sack A, made of any suitable material, (gutta percha is preferable however) in combination with the elastic strap, B, for compressing the teat, and neck of sack, and the exhauster tube E, and piston G, in form and manner, and for the purposes herein substantially set forth.

CYRUS KNAPP.

Witnesses:
CHARLES L. BAIRD,
WILLIAM DEARMAN.